(12) United States Patent
Li et al.

(10) Patent No.: US 12,591,165 B2
(45) Date of Patent: Mar. 31, 2026

(54) CAMERA MODULE AND MOBILE TERMINAL

(71) Applicant: HUAWEI TECHNOLOGIES CO., LTD., Shenzhen (CN)

(72) Inventors: Liang Li, Shenzhen (CN); Shusheng Peng, Dongguan (CN); Chikuan Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 632 days.

(21) Appl. No.: 17/585,792

(22) Filed: Jan. 27, 2022

(65) Prior Publication Data

US 2022/0146910 A1 May 12, 2022

Related U.S. Application Data

(63) Continuation of application No. PCT/CN2020/107094, filed on Aug. 5, 2020.

(30) Foreign Application Priority Data

Aug. 5, 2019 (CN) .......................... 201910718294.4
Aug. 29, 2019 (CN) .......................... 201910806810.9

(51) Int. Cl.
*G03B 17/04* (2021.01)
*G02B 7/02* (2021.01)
(Continued)

(52) U.S. Cl.
CPC .............. *G03B 17/04* (2013.01); *G02B 7/02* (2013.01); *H04N 23/51* (2023.01); *H04N 23/55* (2023.01); *H04N 23/57* (2023.01); *H04M 1/0264* (2013.01)

(58) Field of Classification Search
CPC . G02B 7/92; G02B 7/023; G02B 7/04; G02B 7/09; G02B 7/105; G02B 7/16; G02B 7/1827; H04N 23/57; H04N 23/55
See application file for complete search history.

(56) References Cited

U.S. PATENT DOCUMENTS 4,811,619 A * 3/1989 Cutburth ................. F16H 25/20
74/530
2004/0212702 A1 10/2004 Suh
(Continued)

FOREIGN PATENT DOCUMENTS

CN 1687812 A 10/2005
CN 102129160 A 7/2011
(Continued)

*Primary Examiner* — Sharrief I Broome
*Assistant Examiner* — Journey F Sumlar
(74) *Attorney, Agent, or Firm* — Maier & Maier, PLLC

(57) ABSTRACT

A camera module and a mobile terminal including a base, and a lifting camera lens that may slide relative to the base. Protrusion and retraction of the camera lens of the camera module are implemented through sliding between the base and the lifting camera lens. In addition, the camera module further includes a drive apparatus for driving the lifting camera lens to rise or fall. The drive apparatus includes: a rotating cylinder that may rotate relative to the base, where the rotating cylinder is sleeved outside the lifting camera lens and used to drive the lifting camera lens to rise or fall; and a drive mechanism for driving the rotating cylinder to rotate. When the foregoing structure is used, the rotating cylinder is sleeved outside the lifting camera lens, so that the drive apparatus partially overlaps with the lifting camera lens, thereby reducing a size of the camera module.

20 Claims, 7 Drawing Sheets

(51) Int. Cl.

| | |
|---|---|
| *H04M 1/02* | (2006.01) |
| *H04N 23/51* | (2023.01) |
| *H04N 23/55* | (2023.01) |
| *H04N 23/57* | (2023.01) |

(56) References Cited

U.S. PATENT DOCUMENTS

| | | | |
|---|---|---|---|
| 2005/0122423 | A1 | 6/2005 | Castaneda et al. |
| 2011/0286737 | A1 | 11/2011 | Kim et al. |
| 2016/0109681 | A1* | 4/2016 | Lam ................... G02B 7/28 359/824 |
| 2016/0223779 | A1* | 8/2016 | Terahara .............. G02B 7/10 |
| 2017/0003576 | A1* | 1/2017 | Hatakeyama ......... G03B 17/14 |
| 2018/0180837 | A1* | 6/2018 | Shiraishi .............. G02B 7/10 |
| 2018/0307004 | A1* | 10/2018 | Nagaoka ............. H04N 23/55 |
| 2019/0204616 | A1* | 7/2019 | Yeo ................ H02K 41/0356 |

FOREIGN PATENT DOCUMENTS

| | | | |
|---|---|---|---|
| CN | 102967913 | A | 3/2013 |
| CN | 103163619 | A | 6/2013 |
| JP | H06313829 | A | 11/1994 |
| JP | 2005321696 | A | 11/2005 |
| JP | 2007272105 | A | 10/2007 |
| KR | 10-2005-0000663 | A | 1/2005 |
| KR | 10-2009-0011394 | A | 2/2009 |

\* cited by examiner

CAMERA MODULE AND MOBILE TERMINAL

CROSS-REFERENCE TO RELATED APPLICATIONS

This application is a continuation of International Application No. PCT/CN2020/107094, filed on Aug. 5, 2020, which claims priority to Chinese Patent Application No. 201910718294.4, filed on Aug. 5, 2019 and Chinese Patent Application No. 201910806810.9, filed on Aug. 29, 2019. The disclosures of the aforementioned applications are hereby incorporated by reference in their entireties.

TECHNICAL FIELD

The embodiments relate to the field of mobile terminal technologies, a camera module, and a mobile terminal.

BACKGROUND

Due to limitations on a size of a mobile terminal product, especially limitation in a thickness direction, a size of a camera module becomes smaller. To obtain better image quality, an optical size of an image sensor that matches a camera module of a mobile phone becomes larger, and accordingly, a height of a camera lens that matches the camera module becomes greater. Consequently, a height of the camera module becomes greater accordingly. However, a thickness of the mobile phone does not change or even becomes smaller. Therefore, a camera module for which a large optical size can be used and that can fit into a mobile terminal is required. In the conventional technology, a telescopic camera module is used. However, an existing telescopic camera module has a large size, and cannot adapt to miniaturization development of the mobile terminal.

SUMMARY

The embodiments provide a camera module and a mobile terminal, to improve a size of the camera module and facilitate miniaturization development of the mobile terminal.

According to a first aspect, a camera module is provided. The camera module is applied to a mobile terminal. The camera module includes a base, and a lifting camera lens that may slide relative to the base. Protrusion and retraction of the camera lens of the camera module are implemented through sliding between the base and the lifting camera lens, thereby providing a good shooting effect. In addition, the camera module further includes a drive apparatus for driving the lifting camera lens to rise or fall. The drive apparatus includes: a rotating cylinder that may rotate relative to the base, where the rotating cylinder is sleeved outside the lifting camera lens and used to drive the lifting camera lens to rise or fall; and a drive mechanism for driving the rotating cylinder to rotate. In use, the drive mechanism is used to drive the rotating cylinder to rotate, and the rotating cylinder is used to drive the lifting camera lens to rise or fall, thereby improving a shooting effect of the camera module. In addition, when the foregoing structure is used, the rotating cylinder is sleeved outside the lifting camera lens, so that the drive apparatus partially overlaps with the lifting camera lens, thereby reducing a size of the camera module and facilitating miniaturization development of the mobile terminal.

The drive mechanism and the lifting camera lens may be located on a same side of the base. The size of the camera module is reduced, and the miniaturization development of the mobile terminal is facilitated.

The drive mechanism may include a drive motor fastened to the base, a worm connected to the drive motor, and a gear ring disposed on an outer side wall of the rotating cylinder, and the worm is engaged with the gear ring.

A length direction of an output shaft of the drive motor may be perpendicular to an axis around which the rotating cylinder is rotated. The size of the camera module can be further reduced.

the drive mechanism may include a drive motor fastened to the base, a gear connected to the drive motor, and a gear ring disposed on an outer side wall of the rotating cylinder, and the gear is engaged with the gear ring.

A groove body for accommodating the drive motor may be disposed on the base. Fastening of the drive motor may be facilitated.

The drive mechanism may include two drive motors that are disposed opposite to each other, a worm separately connected to the two motors, and a gear ring disposed on an outer side wall of the rotating cylinder, and the worm is engaged with the gear ring. Output torque of the drive mechanism is increased.

A spiral sliding groove may be disposed on an inner side wall of the rotating cylinder, the lifting camera lens may be provided with a spiral slider that fits into the spiral sliding groove through sliding, an internal thread may be disposed on an inner side wall of the rotating cylinder, and the lifting camera lens may be provided with an external thread that fits the internal thread. The threads fit into each other, to facilitate a rise and a fall.

At least one guide pillar may be disposed on the base, and the lifting camera lens may be assembled on the at least one guide pillar through sliding. The guide pillar is used to limit a sliding direction of the lifting camera lens.

There may be two guide pillars, and the two guide pillars may be symmetrically disposed. A sliding effect is ensured.

The lifting camera lens may be provided with a magnetic component, the at least one guide pillar may be provided with a detection component for detecting the magnetic component, the at least one guide pillar may be provided with a magnetic component, and the lifting camera lens may be provided with a detection component for detecting the magnetic component. The disposed magnetic component and the disposed detection component may be used to detect a location of the lifting camera lens.

The detection component may be a Hall sensor. The Hall sensor may be used to detect the location of the lifting camera lens.

The lifting camera lens may include a lifting cylinder and a camera lens fastened to the lifting cylinder.

The camera module may further include a casing connected to the base in a fastened manner, where the drive apparatus and the lifting camera lens are located inside the casing, and when the lifting camera lens protrudes, the lifting camera lens is exposed outside the casing. The casing and the base fit into each other, to form space for accommodating the drive apparatus and the lifting camera lens.

An elastic sheet may be disposed between the rotating cylinder and the base or an elastic sheet may be disposed between the casing and the rotating cylinder. The elastic sheet is used to reduce a gap inside the camera module.

The casing may be provided with a first through hole through which the lifting camera lens passes, the lifting camera lens may be exposed after passing through the first through hole, and the lifting camera lens may be connected to the first through hole in a sealed manner. A waterproof effect of the camera module is improved.

A sealing ring may be embedded in the first through hole, and an annular groove may be disposed on a surface on which the sealing ring is in contact with the lifting camera lens. The annular groove is disposed, so that there are two contact parts between the sealing ring and the lifting camera lens, thereby improving a sealing effect.

A shoulder may be disposed at one end of the lifting camera lens that is exposed outside the casing, and the shoulder may be in contact with the sealing ring in a sealed manner. The sealing effect is further improved.

According to a second aspect, a camera module is provided. The camera module is applied to a mobile terminal. The camera module includes a base, a lifting camera lens that may slide relative to the base, and a drive apparatus. The drive apparatus includes: a drive block that may slide relative to the base and is used to drive the lifting camera lens to rise or fall; and a drive mechanism for driving the drive block to slide. The drive block and the lifting camera lens are located on a same side of the base, so that the drive apparatus partially overlaps with the lifting camera lens, thereby reducing a size of the camera module and facilitating miniaturization development of the mobile terminal.

The drive mechanism may include a drive motor fastened to the base and a lead screw connected to the drive motor, and the lead screw is threaded through the drive block and threaded with the drive block; and the drive block is provided with a linear sliding groove that inclines relative to a sliding direction of the lifting camera lens, and the lifting camera lens is provided with a slider that is assembled into the linear sliding groove through sliding. The linear sliding groove and the slider fit into each other, to drive the lifting camera lens to rise or fall.

At least one guide pillar may be disposed on the base and the lifting camera lens may be assembled on the at least one guide pillar through sliding. The guide pillar is used to limit a sliding direction of the lifting camera lens.

There are two guide pillars and the two guide pillars may be symmetrically disposed. A sliding effect is ensured.

The lifting camera lens may be provided with a magnetic component, the at least one guide pillar may be provided with a detection component for detecting the magnetic component, the at least one guide pillar may be provided with a magnetic component, and the lifting camera lens may be provided with a detection component for detecting the magnetic component. The disposed magnetic component and the disposed detection component may be used to detect a location of the lifting camera lens.

The detection component may be a Hall sensor. The Hall sensor may be used to detect the location of the lifting camera lens.

The lifting camera lens may include a lifting cylinder and a camera lens fastened to the lifting cylinder.

The camera module may further include a casing connected to the base in a fastened manner, where the drive apparatus and the lifting camera lens are located inside the casing, and when the lifting camera lens protrudes, the lifting camera lens is exposed outside the casing. The casing and the base fit into each other, to form space for accommodating the drive apparatus and the lifting camera lens.

The casing may be provided with a first through hole through which the lifting camera lens passes, the lifting camera lens may be exposed after passing through the first through hole, and the lifting camera lens may be connected to the first through hole in a sealed manner. A waterproof effect of the camera module is improved.

A sealing ring may be embedded in the first through hole and an annular groove may be disposed on a surface on which the sealing ring is in contact with the lifting camera lens. The annular groove is disposed, so that there are two contact parts between the sealing ring and the lifting camera lens, thereby improving a sealing effect.

A shoulder may be disposed at one end of the lifting camera lens that is exposed outside the casing, and the shoulder may be in contact with the sealing ring in a sealed manner. The sealing effect is further improved.

According to a third aspect, a mobile terminal is provided. The mobile terminal includes a housing and the camera module according to any one of the foregoing implementable solutions. The base is fastened inside the housing, and a second through hole that fits the lifting camera lens is disposed on the housing; and when the lifting camera lens rises, the lifting camera lens is exposed after passing through the second through hole. In use, a drive mechanism is used to drive a rotating cylinder to rotate, and the rotating cylinder is used to drive the lifting camera lens to rise or fall, thereby improving a shooting effect of the camera module. In addition, when the foregoing structure is used, the rotating cylinder is sleeved outside the lifting camera lens, so that the drive apparatus partially overlaps with the lifting camera lens, thereby reducing a size of the camera module and facilitating miniaturization development of the mobile terminal.

When the camera module includes a casing, the casing and the housing may be an integral structure. A sealing effect of the mobile terminal is improved.

DETAILED DESCRIPTION OF THE EMBODIMENTS

Figure 1:
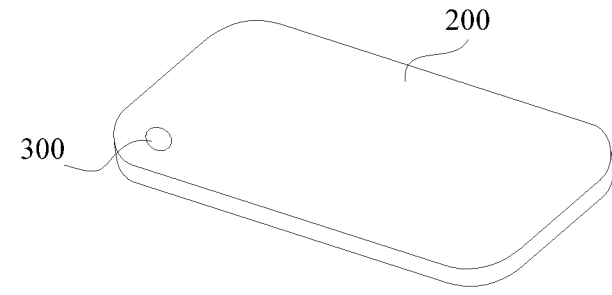
FIG. 1 is a schematic diagram of a structure of a mobile terminal according to an embodiment.

To facilitate understanding of a camera module provided in the embodiments, an application scenario of the camera module is first described. The camera module is applied to a mobile terminal, for example, a common mobile terminal such as a mobile phone, a tablet computer, or a notebook computer. FIG. 1 is a schematic diagram of a structure of a mobile phone. The mobile phone includes a housing 200 and a component disposed inside the housing 200. The component includes a camera module 300. During assembly, the camera module 300 is fastened inside the housing 200, and a second through hole that fits the camera module 300 is disposed on the housing 200, so that a camera lens of the camera module 300 is exposed. To make objectives, solutions, and advantages clearer, the following further describes the embodiments in detail with reference to the accompanying drawings.

Figure 2:
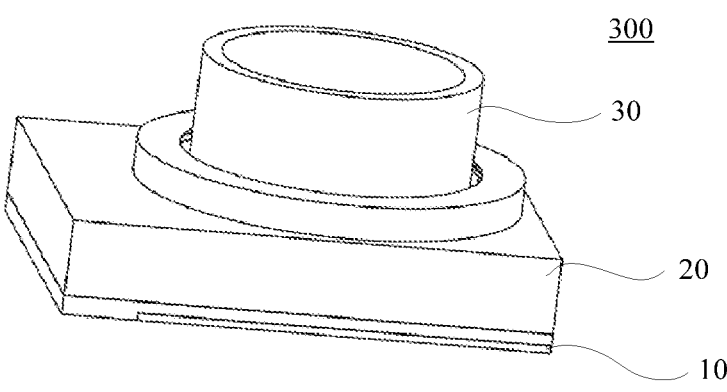
FIG. 2 is a schematic diagram of a structure of a camera module according to an embodiment.

FIG. 2 shows a main structure of a camera module 300 according to an embodiment. The camera module 300 includes a base 10 and a casing 20 connected to the base 10 in a fastened manner. As shown in FIG. 2, the base 10 and the casing 20 are connected in a fastened manner and form a receiving cavity. A lifting camera lens 30 of the camera module 300 is assembled into the receiving cavity, and the lifting camera lens 30 is partially exposed outside the casing 20.

Figure 3:
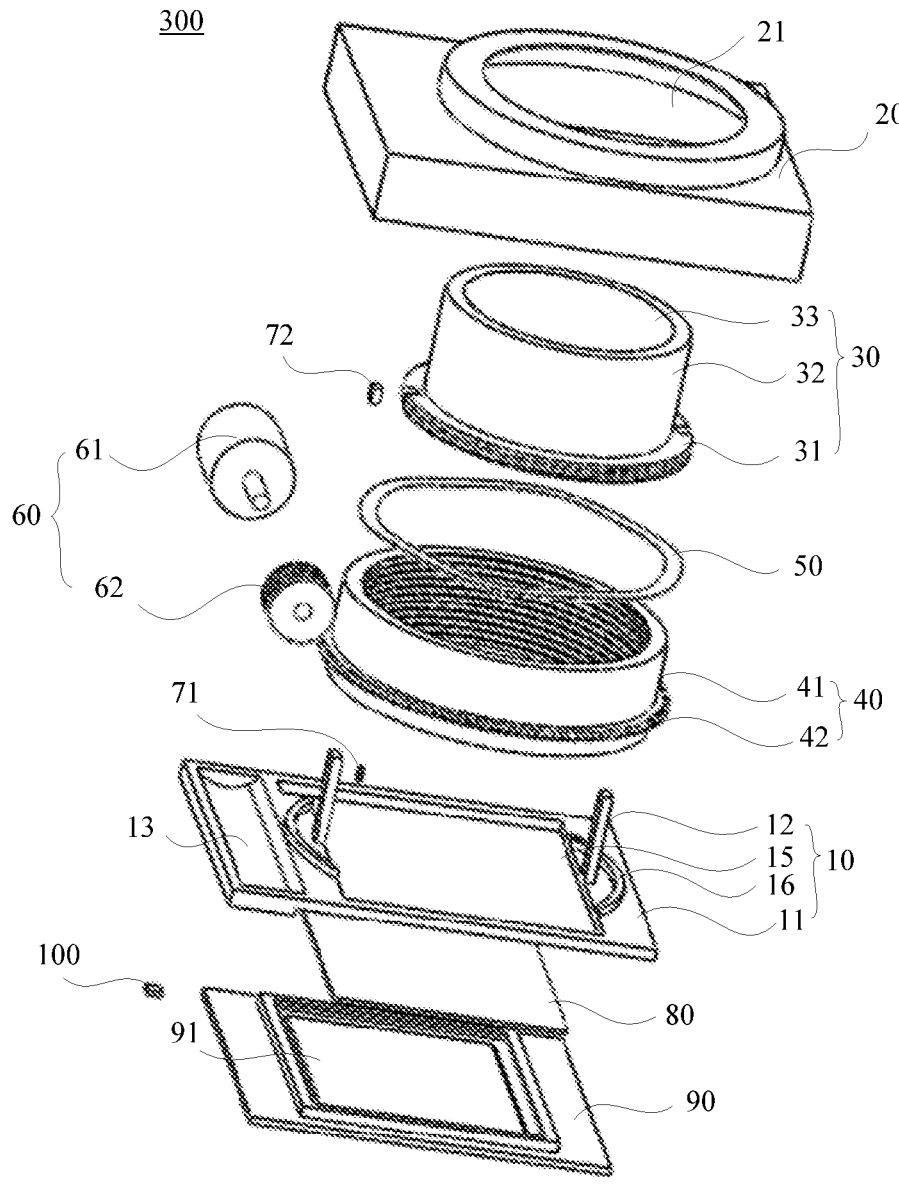
FIG. 3 is a schematic exploded diagram of a camera module according to an embodiment.

FIG. 3 is a schematic exploded diagram of a camera module 300. As shown in FIG. 3, the base 10 of the camera module 300 includes a rectangular support plate 11. The support plate 11 has two opposite surfaces, and the two surfaces are respectively a first surface and a second surface. A printed circuit board 90 is disposed on one side of the second surface of the base 10. An image sensor 91 is disposed on the printed circuit board 90, and the image sensor 91 is electrically connected to the printed circuit board 90. In addition, a hollowed-out structure 15 is disposed on the support plate 11, and a light filter 80 is embedded in the hollowed-out structure 15. During a connection, the support plate 11 is connected to the printed circuit board 90 in a fastened manner, and the light filter 80 covers the image sensor 91. In FIG. 3, the hollowed-out structure 15 and the light filter 80 are in a rectangular structure. However, it should be understood that shapes of the light filter 80 and the hollowed-out structure 15 are not limited in this embodiment. During production, structures of the hollowed-out structure 15 and the light filter 80 may be adjusted based on an actual requirement, for example, may be in a circular shape, an oval shape, or another shape.

The camera module 300 provided in this embodiment further includes a lifting camera lens 30. The lifting camera lens 30 includes a lifting cylinder 32 and a camera lens 33 fastened to the lifting cylinder 32. As shown in FIG. 3, the lifting cylinder 32 is a circular cylinder body, and both ends of the lifting cylinder 32 are open. Correspondingly, the camera lens 33 is a circular lens. During assembly, the camera lens 33 is embedded in the lifting cylinder 32 and is located at one end of the lifting cylinder 32. When the lifting cylinder 32 is assembled on the base 10, the lifting camera lens 30 and the base 10 may slide relative to each other. For a structure, refer to FIG. 3. Two guide pillars 12 are located on one side of the first surface of the support plate 11, and the two guide pillars 12 are symmetrically disposed. In FIG. 3, the two guide pillars 12 are disposed on two sides of the hollowed-out structure 15 and are symmetrical with respect to an axis of the hollowed-out structure 15. The lifting camera lens 30 is assembled on the two guide pillars 12 through sliding. During assembly, the lifting camera lens 30 is provided with two through holes (not shown in the figure), and the two guide pillars 12 are assembled in the two through holes in a one-to-one correspondence. When the lifting camera lens 30 is assembled on the base 10 through sliding, the lifting camera lens 30 may slide in a length direction of the guide pillar 12. However, in FIG. 3, the length direction of the guide pillar 12 is perpendicular to the second surface of the support plate 11. Therefore, when the lifting camera lens 30 slides in the length direction of the guide pillar 12, the camera lens 33 may approach the image sensor 91 and be away from the image sensor 91. A quantity of guide pillars 12 provided in this embodiment is not limited to two shown in FIG. 3 and may alternatively be a different quantity such as one, three, or four. When the lifting camera lens 30 is assembled on the guide pillar 12, the camera lens 33 and an image processor are disposed coaxially, to ensure a shooting effect of a camera.

The camera module 300 provided in this embodiment further includes a casing 20. The casing 20 and the base 10 are connected in a fastened manner and form space for accommodating a drive apparatus and the lifting camera lens 30. As shown in FIG. 3, the casing 20 is of a cuboid structure and has a hollow cavity. When the casing 20 is connected to the base 10 in a fastened manner, the casing 20 may be connected to the base 10 by using a threaded connection part such as a bolt or a screw or may be connected to the base 10 through bonding or welding. In addition, the support plate 11 and the casing 20 enclose space for accommodating a lifting apparatus and the drive apparatus. In addition, the casing 20 is further provided with one first through hole 21. When sliding between the lifting camera lens 30 and the base 10, the lifting camera lens 30 may pass through the first through hole 21 and be exposed outside the casing 20.

The camera module 300 provided in this embodiment further includes the drive apparatus, and the drive apparatus is configured to drive the lifting camera lens 30 to slide. The drive apparatus includes two parts: a drive mechanism 60 and a rotating cylinder 40. As shown in FIG. 3, the rotating cylinder 40 is a cylinder body 41 with two open ends, and the rotating cylinder 40 and the base 10 may rotate relative to each other. During assembly, two opposite arc-shaped protrusions 16 are disposed on the support plate 11 of the base 10, and the rotating cylinder 40 is sleeved outside the arc-shaped protrusions 16, to limit the rotating cylinder 40 in a radial direction, so that the rotating cylinder 40 can rotate around the arc-shaped protrusion 16. When the arc-shaped protrusions 16 are disposed, the two arc-shaped protrusions 16 are disposed oppositely on two sides of the hollowed-out structure 15, and inner concave directions of the arc-shaped protrusions 16 are opposite to each other. In addition, the arc-shaped protrusions 16 are located outside the guide pillar 12. When the rotating cylinder 40 is assembled, the rotating cylinder 40 can be sleeved outside the lifting camera lens 30. After nesting, the rotating cylinder 40 and the lifting camera lens 30 are coaxially disposed and spirally connected. As shown in FIG. 3, an inner side wall of the rotating cylinder 40 is provided with an internal thread, and the lifting camera lens 30 is provided with an external thread that fits the internal thread. When the external thread is disposed, as shown in FIG. 3, a shoulder 31 is disposed at one end that is of the lifting cylinder 32 of the lifting camera lens 30 and that is away from the camera lens 33, and the external thread is disposed on the shoulder 31. When the lifting camera lens 30 is assembled, the shoulder 31 of the lifting camera lens 30 is sleeved outside the guide pillar 12 in a direction toward the support plate 11, and then is screwed into the rotating cylinder 40, so that the internal thread of the rotating cylinder 40 fits the external thread. The rotating cylinder 40 is screwed to a location at which the rotating cylinder 40 is in contact with the support plate 11, and in this case, the rotating cylinder 40 is sleeved outside the arc-shaped protrusions 16. When the casing 20 is connected to the base 10 in a fastened manner, top and bottom ends of the rotating cylinder 40 respectively abut against the casing 20 and the support plate 11, to ensure that the rotating cylinder 40 is limited in a radial direction. When the rotating cylinder 40 rotates, because the rotating cylinder 40 cannot move axially, the internal thread and the external thread fit into each other, to drive the lifting camera lens 30 to rise or fall. For example, when the rotating cylinder 40 rotates to the right, the lifting cylinder 32 may slide away from the support plate 11, and when the rotating cylinder 40 rotates to the left, the lifting cylinder 32 may slide towards the support plate 11. Also, in addition to the foregoing fitting between the internal thread and the external thread, in the camera module provided in this implementation, another manner may alternatively be used to enable the rotating cylinder to drive the lifting camera lens. For example, the inner side wall of the rotating cylinder is provided with a spiral sliding groove, and the lifting camera lens is provided with a spiral slider that fits into the spiral sliding groove through sliding. At least two spiral sliding grooves such as three or four spiral sliding grooves may be disposed inside the rotating cylinder. During disposing, the spiral sliding grooves rise spirally along the inner side wall of the rotating cylinder and are evenly distributed inside the rotating cylinder. A spiral slider that fits into each spiral sliding groove is also disposed inside the lifting cylinder of the corresponding lifting camera lens, and the spiral slider and the spiral sliding groove fit into each other, so that when the rotating cylinder rotates, the lifting camera lens is driven to rise or fall.

In addition, when the rotating cylinder 40 is assembled, an assembly gap is inevitably generated between the base 10 and the casing 20. Therefore, to limit axial movement of the rotating cylinder 40, an elastic sheet 50 is disposed between the rotating cylinder 40 and the base 10, or an elastic sheet 50 is disposed between the casing 20 and the rotating cylinder 40. Elastic force of the disposed elastic sheet 50 makes one end of the rotating cylinder 40 abut against the casing 20 or abut against the support plate 11, thereby ensuring that the rotating cylinder 40 is limited in an axial direction. Stability is ensured when the lifting camera lens 30 is driven. In addition, the elastic sheet 50 is disposed on an end face of the rotating cylinder 40, to reduce friction between the rotating cylinder 40 and the support plate 11 or the casing 20, eliminate a gap between the rotating cylinder 40 and the support plate 11 or the casing 20, and reduce a return difference. Additionally, two elastic sheets 50 may alternatively be disposed. In this case, the elastic sheet 50 is disposed between the casing 20 and the rotating cylinder 40 and between the rotating cylinder 40 and the support plate 11, to achieve a same effect.

The drive apparatus provided in this embodiment further includes a drive mechanism 60, and the drive mechanism 60 is configured to drive the rotating cylinder 40 to rotate. As shown in FIG. 3, the drive mechanism 60 and the lifting camera lens 30 are located on a same side of the base 10. A structure of the drive mechanism may include a drive motor 61, a worm 62 connected to the drive motor 61, and a gear ring 42 disposed on an outer side wall of the rotating cylinder 40. The worm 62 is engaged with the gear ring 42. Also, the drive motor may alternatively be used to connect to a gear reducer, and then connect to the worm through the gear reducer. A connection manner of the drive motor and the gear reducer is a common connection manner. Details are not described herein again.

During assembly, as shown in FIG. 3, the drive motor 61 is fastened on the base 10, a support plate 11 is provided with an arc-shaped mounting groove 13, and the drive motor 61 is horizontally positioned in the mounting groove 13 and is connected to the mounting groove 13 in a fastened manner. The drive motor 61 may be fastened in the mounting groove 13 by using an adhesive connection part or a threaded connection part (a bolt or a screw). In this case, a length direction of an output shaft of the drive motor 61 is perpendicular to an axis around which the rotating cylinder 40 rotates. In other words, the output shaft of the drive motor 61 is perpendicular to a sliding direction of the lifting camera lens 30. The output shaft of the drive motor 61 is connected to a worm 62, a gear ring 42 is correspondingly disposed on the outer side wall of the rotating cylinder 40, and the gear ring 42 is engaged with the worm 62. When the drive motor 61 rotates, the worm 62 and the gear ring 42 fit into each other to convert horizontal rotation into vertical rotation, to drive the rotating cylinder 40 to rotate, and then drive, through rotation of the rotating cylinder 40, the lifting camera lens 30 to rise or fall. In an embodiment, the drive motor may alternatively be used to connect to a gear reducer, and then connect to the worm through the gear reducer. A connection manner of the drive motor and the gear reducer is a common connection manner. Details are not described herein again.

It can be understood from the foregoing structure that in this embodiment, the lifting camera lens 30 protrudes from the structure, the guide pillar 12 passes through the base 10, and the drive apparatus is disposed on a periphery of the lifting camera lens 30, to minimize a size of a protrusion part. In addition, the drive apparatus and the lifting camera lens 30 are located on a same side of the support plate 11, and the drive apparatus may further partially overlap with the lifting camera lens 30 in a height direction. In comparison with the conventional technology in which the lifting camera lens 30 and the drive apparatus separately occupy space, space occupied by the camera module 300 may be reduced, thereby facilitating miniaturization development of the mobile terminal.

Still refer to FIG. 3. When the drive motor 61 is connected to the base 10 in a fastened manner, a motor drive IC 100 is disposed on the printed circuit board 90. The motor drive IC 100 is connected to the drive motor 61, and the motor drive IC 100 may be used to drive the drive motor 61 to rotate forward or reversely, to drive the lifting camera lens 30 to rise or fall. On the mobile terminal, when the camera module 300 does not perform shooting, the lifting camera lens 30 is retracted into the mobile terminal, without affecting an overall thickness of the mobile terminal. During shooting, the lifting camera lens 30 protrudes from a body of the mobile terminal, to increase available optical space and achieve high-quality image shooting.

In addition, to detect a location of the lifting camera lens 30, a magnetic component may be disposed on the lifting camera lens 30. When there is at least one guide pillar, a detection component for detecting the magnetic element may be disposed on one guide pillar 12, or a detection component may be disposed on some or all guide pillars 12. When there is at least one guide pillar, a magnetic component may be disposed on one guide pillar 12, or a detection component may be disposed on some or all guide pillars 12. The lifting camera lens 30 is provided with the detection component for detecting the magnetic component. The magnetic component may be a magnet 72, and the detection component may be a Hall sensor 71. As shown in FIG. 3, the Hall sensor 71 may be mounted on one of the guide pillars 12, and the magnet 72 is mounted on the lifting cylinder 32 and is parallel and opposite to the Hall sensor 71. When the lifting cylinder 32 and the camera lens 33 move up and down, the magnet 72 is driven to move, and the Hall sensor 71 determines location information of the camera lens 33 by sensing a change in a magnetic field. In addition, the printed circuit board 90 is connected to the Hall sensor 71, to receive a signal from the Hall sensor 71, and further obtain location information of the lifting camera lens 30. It can be understood from the foregoing description that the guide pillar 12 protruding from the base 10 can be used to ensure that the lifting cylinder 32 makes rectilinear motion and may be further used to implement closed-loop control of mounting and fastening of the Hall sensor 71, thereby reducing size and costs.

Figure 4:
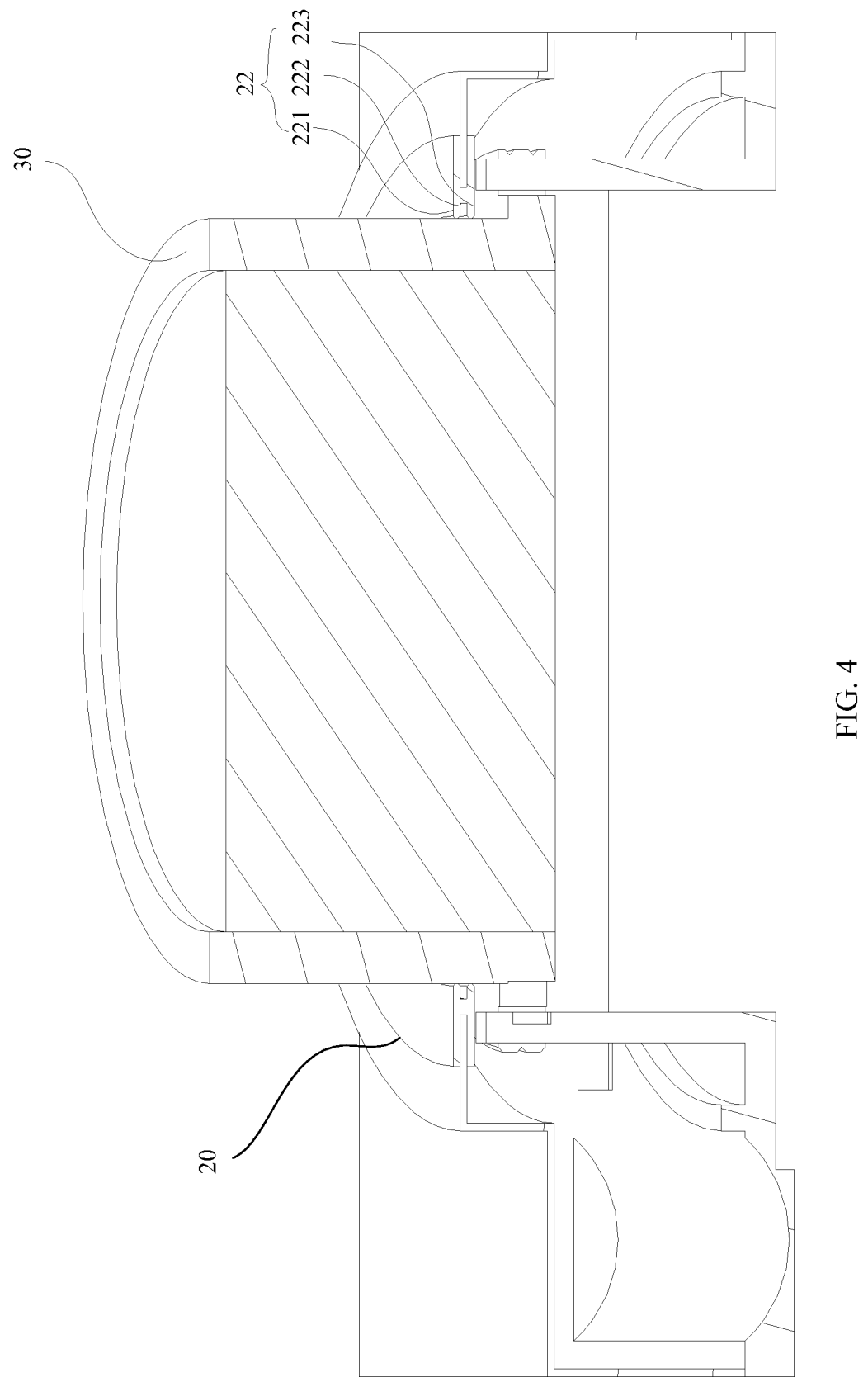
FIG. 4 is a schematic diagram of a structure of a camera module according to an embodiment.

When the lifting camera lens 30 passes through the first through hole of the casing and then is exposed, a gap exists between the lifting camera lens 30 and the casing, to improve a sealing effect of the lifting camera lens 30. The lifting camera lens 30 is connected to the first through hole in a sealed manner. Through sealing between the lifting camera lens 30 and the first through hole, external liquid or moisture is prevented from entering into the camera module. As shown in FIG. 4, a sealing ring 22 is embedded in the first through hole, and an annular groove 222 is disposed on a surface on which the sealing ring 22 is in contact with the lifting camera lens 30. The sealing ring 22 may be embedded on a side wall of the first through hole, and the sealing ring 22 may have a mounting groove that is sleeved on the side wall of the first through hole. Two side walls of the mounting groove are respectively clamped on two end faces of the side wall of the first through hole. An annular groove 222 is also disposed on a surface that is of the sealing ring 22 and that faces the lifting camera lens 30, and the annular groove 222 cuts, into two parts, one end that is of the sealing ring 22 and that is in contact with the lifting camera lens 30. For ease of description, the two parts are named a first contact part 221 and a second contact part 223. The first contact part 221 and the second contact part 223 are separately in contact with the lifting cylinder of the lifting camera lens 30 in a sealed manner. During sealing, both the first contact part 221 and the second contact part 223 are deformed, so that the sealing ring 22 forms double-layer sealing on the lifting camera lens 30, thereby improving a sealing effect.

Figure 5:
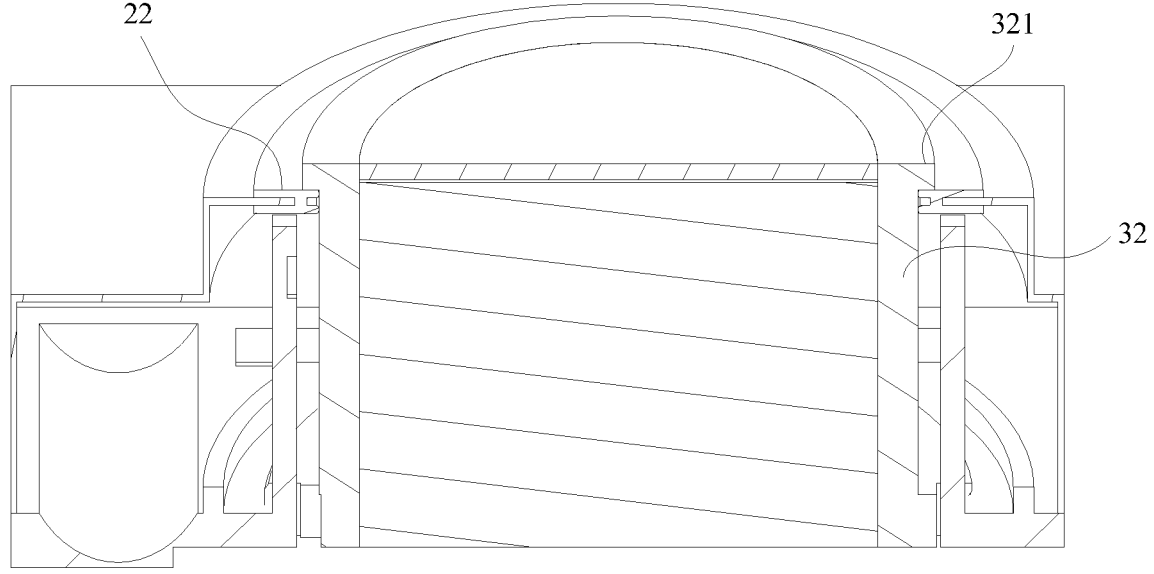
FIG. 5 is a schematic diagram of another sealing structure of a camera module according to an embodiment.

As shown in FIG. 5, to further improve the sealing effect, a shoulder 321 is disposed at one end that is of the lifting camera lens 30 and that is exposed outside the casing, and the shoulder 321 may be in contact with the sealing ring 22 in a sealed manner. When the lifting camera lens 30 is retracted to an initial location, the shoulder 321 abuts against an end face of the sealing ring 22, to form sealing between the shoulder 321 and the sealing ring 22 in both axial and radial directions. In an implementable solution, an annular protrusion may be further disposed on a surface that is of the sealing ring 22 and that faces the shoulder 321, and the shoulder 321 extrudes the protrusion to cause a deformation. Alternatively, an annular groove that fit the protrusion may be further disposed on the shoulder 321, and sealing of the lifting camera lens 30 is implemented through fitting between the protrusion and the groove.

Figure 6:
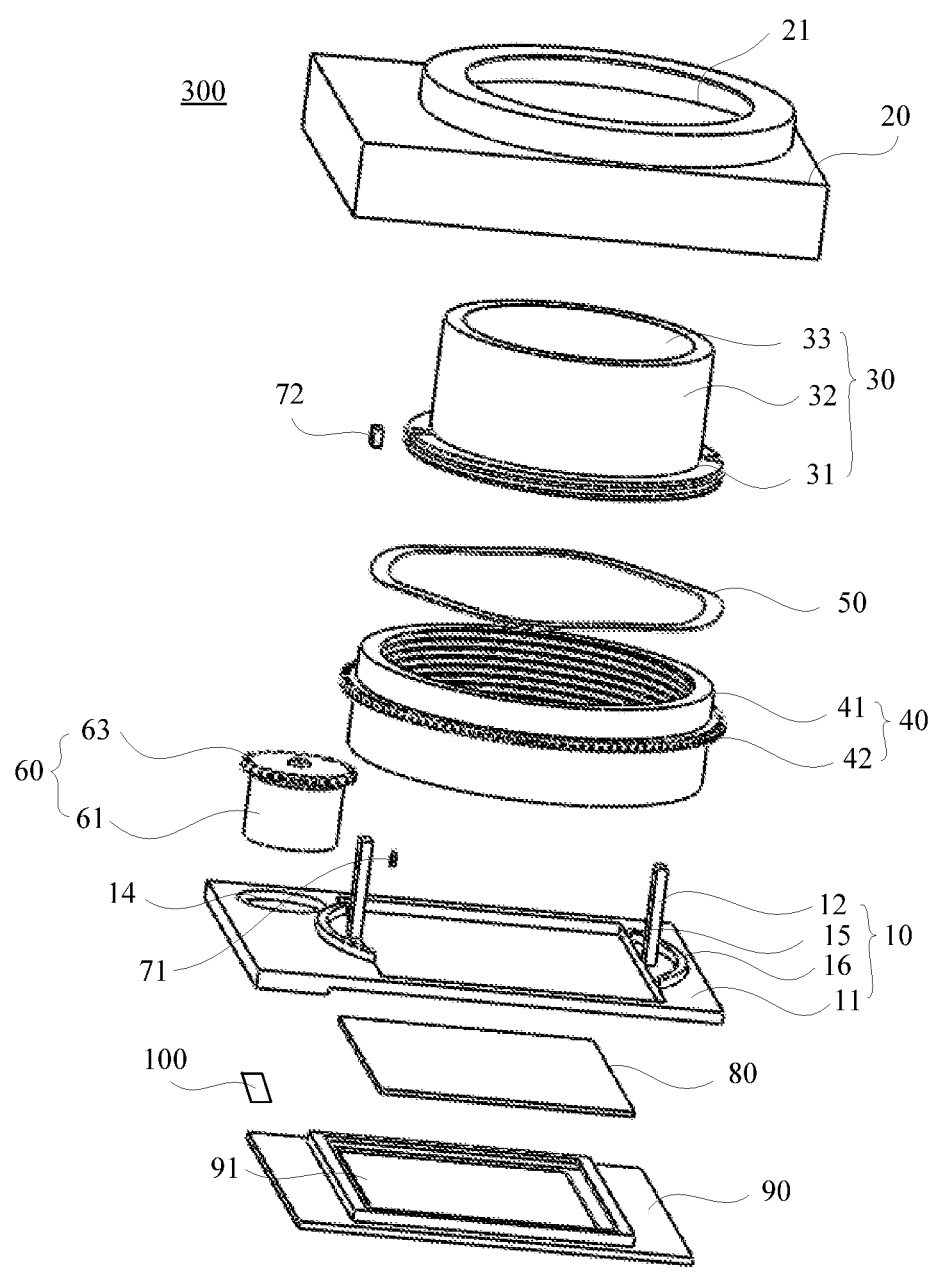
FIG. 6 is a schematic exploded diagram of another camera module according to an embodiment.

FIG. 6 is a schematic exploded diagram of another camera module 300 according to an embodiment. For a same reference numeral in FIG. 6, refer to the same reference numeral in FIG. 3. FIG. 6 differs from FIG. 3 in a drive mechanism 60. In FIG. 6, the drive mechanism 60 and a lifting camera lens 30 are located on a same side of a base 10. The drive mechanism 60 includes a drive motor 61 fastened to the base 10, a gear 63 connected to the drive motor 61, and a gear ring 42 disposed on an outer side wall of the rotating cylinder 40. The gear 63 is engaged with a gear ring 42. In an embodiment, the drive motor may alternatively be used to connect to a gear reducer, and then connect to the gear through the gear reducer. A connection manner of the drive motor and the gear reducer is a common connection manner. Details are not described herein again.

When the drive motor 61 is fastened, a circular mounting groove 14 is disposed on a support plate 11. The drive motor

61 may be fastened in the mounting groove 14 by using an adhesive connection part or a screw connection part (a bolt or a screw). In this case, a length direction of an output shaft of the drive motor 61 is parallel to an axis around which the rotating cylinder 40 rotates. In other words, the output shaft of the drive motor 61 is parallel to a sliding direction of the lifting camera lens 30. The output shaft of the drive motor 61 is connected to a gear 63, a gear ring 42 is correspondingly disposed on the outer side wall of the rotating cylinder 40, and the gear ring 42 is engaged with the gear 63. When the drive motor 61 rotates, the gear 63 and the gear ring 42 fit into each other, to drive the rotating cylinder 40 to rotate, and then drive, through rotation of the rotating cylinder 40, the lifting camera lens 30 to rise or fall.

For sealing of the camera module shown in FIG. 6, refer to sealing structures shown in FIG. 6 and FIG. 5. Details are not described herein again.

It can be understood from the foregoing structure that in this embodiment, the lifting camera lens 30 protrudes from the structure, a guide pillar 12 passes through the base 10, and a drive apparatus is disposed on a periphery of the lifting camera lens 30, to minimize a size of a protrusion part. In addition, the drive apparatus and the lifting camera lens 30 are located on a same side of the support plate 11, and the drive apparatus may further partially overlap with the lifting camera lens 30 in a height direction. In comparison with the conventional technology in which the lifting camera lens 30 and the drive apparatus separately occupy space, space occupied by the camera module 300 may be reduced, thereby facilitating miniaturization development of a mobile terminal.

Figure 7:
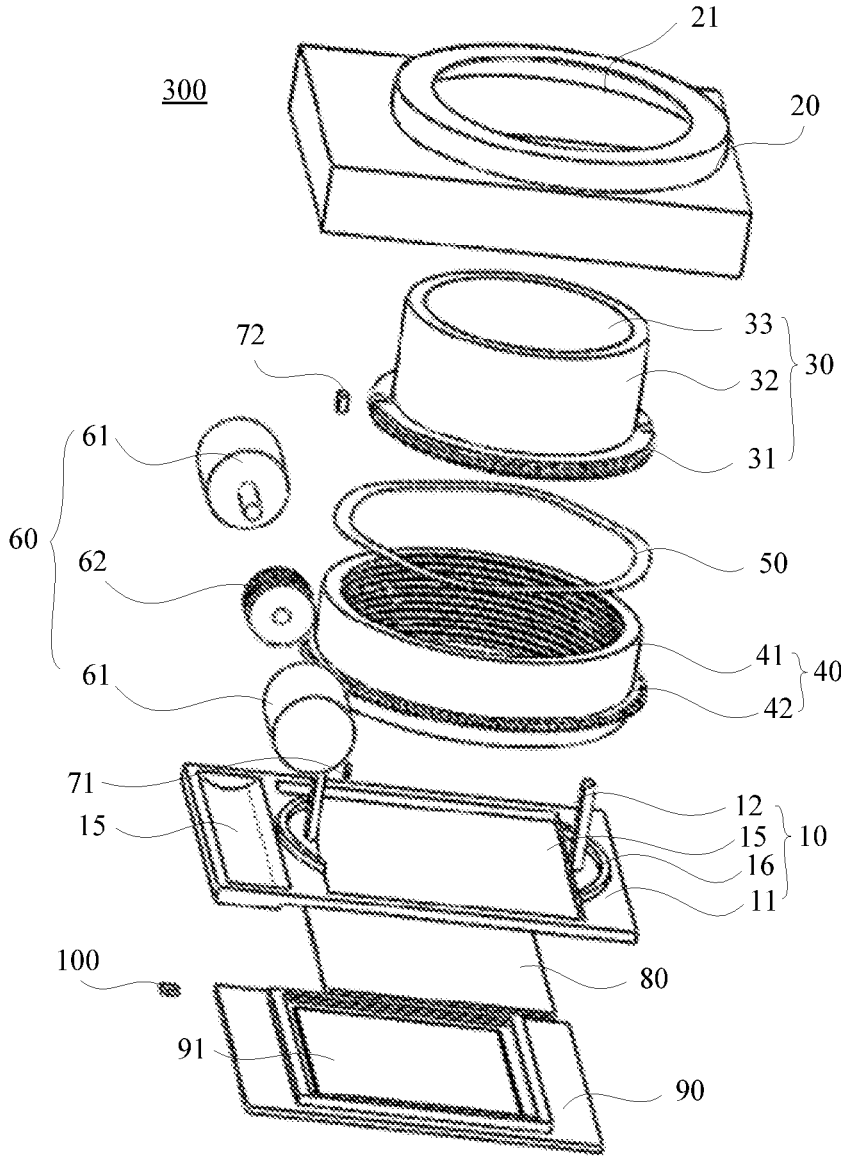
FIG. 7 is a schematic exploded diagram of a third camera module according to an embodiment.

FIG. 7 is a schematic exploded diagram of another camera module 300 according to an embodiment. For a same reference numeral in FIG. 7, refer to the same reference numeral in FIG. 3. FIG. 7 differs from FIG. 3 in a drive mechanism 60. In FIG. 7, the drive mechanism 60 and a lifting camera lens 30 are located on a same side of a base 10. A structure of the drive mechanism includes two drive motors 61 that are disposed opposite to each other, a worm 62 that is separately connected to the two motors, and a gear ring 42 disposed on an outer side wall of the rotating cylinder 40. The worm 62 is engaged with the gear ring 42. Additionally, the drive motor may alternatively be used to connect to a gear reducer, and then connect to the worm through the gear reducer. A connection manner of the drive motor and the gear reducer is a common connection manner. Details are not described herein again.

During assembly, as shown in FIG. 7, the drive motor 61 is fastened on the base 10, a support plate 11 is provided with an arc-shaped mounting groove 13, and the drive motor 61 is horizontally positioned in the mounting groove 13 and is connected to the mounting groove 13 in a fastened manner. The drive motor 61 may be fastened in the mounting groove 13 by using an adhesive connection part or a threaded connection part (a bolt or a screw). Output shafts of the two drive motors 61 are disposed opposite to each other. A length direction of the output shaft of the drive motor 61 is perpendicular to an axis around which the rotating cylinder 40 rotates. In other words, the output shaft of the drive motor 61 is perpendicular to a sliding direction of the lifting camera lens 30. The two output shafts of the drive motors 61 are respectively connected to two ends of the worm 62, and the two drive motors 61 and the worm 62 are coaxially disposed. The outer side wall of the rotating cylinder 40 is provided with a gear ring 42, and the gear ring 42 is engaged with the worm 62. When the drive motors 61 rotate, the two drive motors 61 simultaneously drive the worm 62 to rotate, and the worm 62 and the gear ring 42 fit into each other to convert horizontal rotation into vertical rotation, to drive the rotating cylinder 40 to rotate, and then drive, through rotation of the rotating cylinder 40, the lifting camera lens 30 to rise or fall.

For sealing of the camera module shown in FIG. 7, refer to sealing structures shown in FIG. 4 and FIG. 5. Details are not described herein again.

It can be understood from the foregoing structure that in this embodiment, the lifting camera lens 30 protrudes from the structure, a guide pillar 12 passes through the base 10, and a drive apparatus is disposed on a periphery of the lifting camera lens 30, to minimize a size of a protrusion part. In addition, the drive apparatus and the lifting camera lens 30 are located on a same side of the support plate 11, and the drive apparatus may further partially overlap with the lifting camera lens 30 in a height direction. In comparison with the conventional technology in which the lifting camera lens 30 and the drive apparatus separately occupy space, space occupied by the camera module 300 may be reduced, thereby facilitating miniaturization development of a mobile terminal. In addition, in the structure shown in FIG. 7, the two drive motors 61 are used. Therefore, large output torque can be provided, and a driving effect can be improved. In addition, the two drive motors 61 can be used to reduce load of each drive motor 61, thereby increasing a service life of the drive motor 61.

Figure 8:
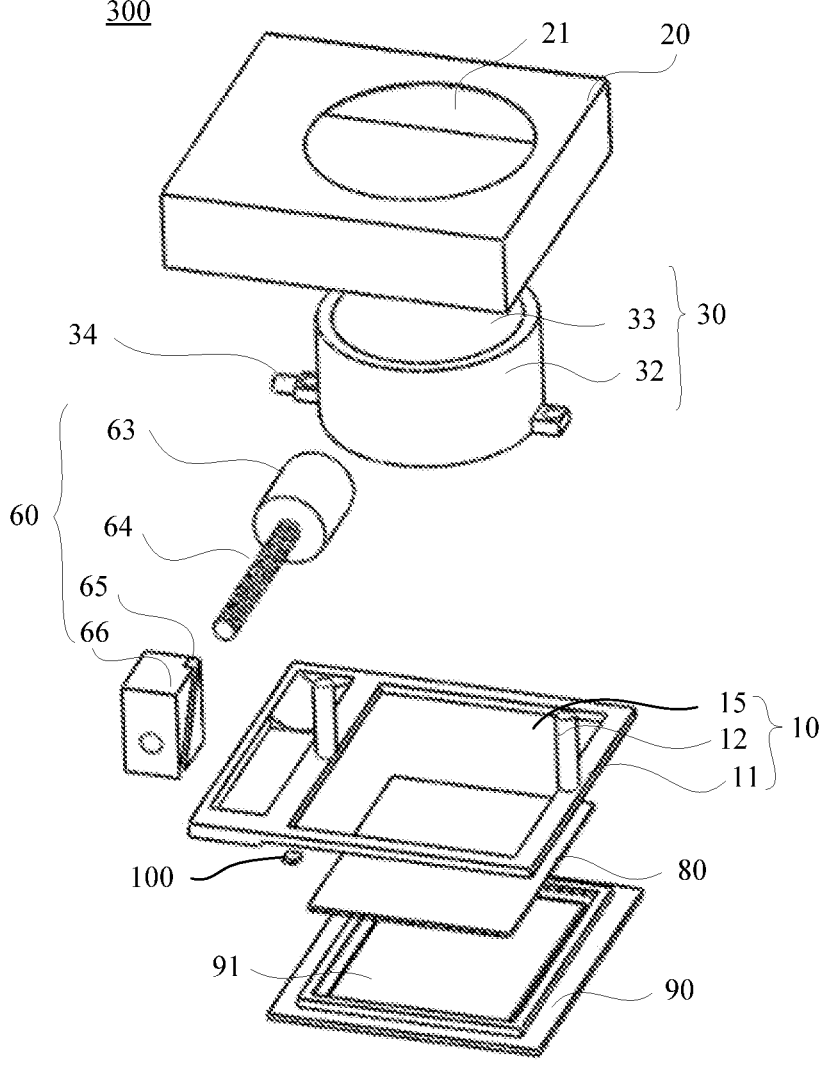
FIG. 8 is a schematic exploded diagram of a fourth camera module according to an embodiment.

FIG. 8 shows a fourth camera module according to an embodiment. A base 10 of a camera module 300 includes a rectangular support plate 11. The support plate 11 has two opposite surfaces, and the two surfaces are respectively a first surface and a second surface. A printed circuit board 90 is disposed on one side of the second surface of the base 10. An image sensor 91 is disposed on the printed circuit board 90, and the image sensor 91 is electrically connected to the printed circuit board 90. In addition, a hollowed-out structure 15 is disposed on the support plate 11, and a light filter 80 is embedded in the hollowed-out structure 15. During a connection, the support plate 11 is connected to the printed circuit board 90 in a fastened manner, and the light filter 80 covers the image sensor 91. In FIG. 8, the hollowed-out structure 15 and the light filter 80 are in a rectangular structure. However, it should be understood that shapes of the light filter 80 and the hollowed-out structure 15 are not limited in this embodiment. During production, structures of the hollowed-out structure 15 and the light filter 80 may be adjusted based on an actual requirement, for example, may be in a circular shape, an oval shape, or another shape.

The camera module 300 provided in this embodiment further includes a lifting camera lens 30. The lifting camera lens 30 includes a lifting cylinder 32 and a camera lens 33 fastened to the lifting cylinder 32. As shown in FIG. 8, the lifting cylinder 32 is a circular cylinder body, and both ends of the lifting cylinder 32 are open. Correspondingly, the camera lens 33 is a circular lens. During assembly, the camera lens 33 is embedded in the lifting cylinder 32 and is located at one end of the lifting cylinder 32. When the lifting cylinder 32 is assembled on the base 10, the lifting camera lens 30 and the base 10 may slide relative to each other. For a structure, refer to FIG. 8. Two guide pillars 12 are located on one side of the first surface of the support plate 11, and the two guide pillars 12 are symmetrically disposed. In FIG. 8, the two guide pillars 12 are disposed on two sides of the hollowed-out structure 15 and are symmetrical along an axis of the hollowed-out structure 15. The lifting camera lens 30 is assembled on the two guide pillars 12 through sliding. During assembly, the lifting camera lens 30 is provided with two through holes (not shown in the figure), and the two guide pillars 12 are assembled in the two through holes in a one-to-one correspondence. When the lifting camera lens 30 is assembled on the base 10 through sliding, the lifting camera lens 30 may slide in a length direction of the guide pillar 12. However, in FIG. 8, the length direction of the guide pillar 12 is perpendicular to the second surface of the support plate 11. Therefore, when the lifting camera lens 30 slides in the length direction of the guide pillar 12, the camera lens 33 may approach the image sensor 91 and be away from the image sensor. A quantity of guide pillars 12 provided in this embodiment is not limited to two shown in FIG. 8 and may alternatively be a different quantity such as one, three, or four. When the lifting camera lens 30 is assembled on the guide pillar 12, the camera lens 33 and an image processor are disposed coaxially, to ensure a shooting effect of a camera.

The camera module 300 provided in this embodiment further includes a casing 20. The casing 20 and the base 10 are connected in a fastened manner and form space for accommodating the drive apparatus and the lifting camera lens 30. As shown in FIG. 8, the casing 20 is of a cuboid structure and has a hollow cavity. When the casing 20 is connected to the base 10 in a fastened manner, the casing 20 may be connected to the base 10 by using a threaded connection part such as a bolt or a screw or may be connected through bonding or welding. In addition, the support plate 11 and the casing 20 enclose space for accommodating a lifting apparatus and the drive apparatus. In addition, the casing 20 is further provided with one first through hole 21. When sliding between the lifting camera lens 30 and base 10, the lifting camera lens 30 may pass through the first through hole 21 and be exposed outside the casing 20.

The camera module 300 provided in this embodiment further includes the drive apparatus, and the drive apparatus is configured to drive the lifting camera lens 30 to slide. The drive apparatus includes a drive block 66 that may slide relative to the base 10 and is used to drive the lifting camera lens to rise or fall; and a drive mechanism for driving the drive block 66 to slide. As shown in FIG. 8, the drive mechanism includes a drive motor fastened to the base and a lead screw 62 connected to the drive motor, and the lead screw 62 is threaded through the drive block 66 and threaded with the drive block 66. The drive block 66 is assembled on the first surface of the support plate 11 through sliding. As shown in FIG. 8, a groove (not shown in the figure) for mounting the drive motor 61 and a sliding groove (not shown in the figure) for assembling the drive block 66 through sliding are separately disposed on the first surface of the base 10. When the drive motor 61 rotates, the drive block is driven to slide in the sliding groove. In addition, when the drive block is connected to the lifting camera lens 30, the drive block 66 is provided with a linear sliding groove 65 that inclines relative to a sliding direction of the lifting camera lens 30, and the lifting camera lens 30 is provided with a slider 34 that is assembled into the linear sliding groove 65 through sliding. When the drive block 66 slides horizontally, the linear sliding groove 65 and the slider 34 fit into each other to convert horizontal sliding of the drive block 66 into vertical movement of the lifting camera lens 30. Additionally, the drive motor may alternatively be used to connect to a gear reducer, and then connect to the lead screw through the gear reducer. A connection manner of the drive motor and the gear reducer is a common connection manner. Details are not described herein again.

It can be understood from the foregoing structure that in this embodiment, the lifting camera lens 30 protrudes from the structure, a guide pillar 12 passes through the base 10, and a drive apparatus is disposed on a periphery of the lifting camera lens 30, to minimize a size of a protrusion part. In addition, the drive apparatus and the lifting camera lens 30 are located on a same side of the support plate 11, and the drive apparatus may further partially overlap with the lifting camera lens 30 in a height direction. In comparison with the conventional technology in which the lifting camera lens and the drive apparatus separately occupy space, space occupied by the camera module 300 may be reduced, thereby facilitating miniaturization development of a mobile terminal.

When the drive motor 61 is connected to the base 10 in a fastened manner, a motor drive IC 100 is disposed on the printed circuit board 90. The motor drive IC 100 is connected to the drive motor 61, and the motor drive IC 100 may be used to drive the drive motor 61 to rotate forward or reversely, to drive the lifting camera lens 30 to rise or fall. On the mobile terminal, when the camera module 300 does not perform shooting, the lifting camera lens 30 is retracted into the mobile terminal, without affecting an overall thickness of the mobile terminal. During shooting, the lifting camera lens 30 protrudes from a body of the mobile terminal, to increase available optical space and achieve high-quality image shooting.

In addition, to detect a location of the lifting camera lens 30, a magnetic component may be disposed on the lifting camera lens 30. When there is at least one guide pillar, a detection component for detecting the magnetic element may be disposed on one guide pillar 12, or a detection component may be disposed on some or all guide pillars 12. When there is at least one guide pillar, a magnetic component may be disposed on one guide pillar 12, or a detection component may be disposed on some or all guide pillars 12. The lifting camera lens 30 is provided with the detection component for detecting the magnetic component. The magnetic component may be a magnet, and the detection component may be a Hall sensor. The Hall sensor may be mounted on one of the guide pillars 12, the magnet is mounted on the lifting cylinder 32 and is parallel and opposite to the Hall sensor. When the lifting cylinder 32 and the camera lens 33 move up and down, the magnet is driven to move, and the Hall sensor determines location information of the camera lens 33 by sensing a change in a magnetic field. In addition, the printed circuit board 90 is connected to the Hall sensor, to receive a signal from the Hall sensor, and further obtain location information of the lifting camera lens 30. It can be understood from the foregoing description that the guide pillar 12 protruding from the base 10 can be used to ensure that the lifting cylinder 32 makes rectilinear motion and may be further used to implement closed-loop control of mounting and fastening of the Hall sensor, thereby reducing a size and costs.

When the lifting camera lens passes through the first through hole of the casing and then is exposed, a gap exists between the lifting camera lens and the casing, to improve a sealing effect of the lifting camera lens. The lifting camera lens is connected to the first through hole in a sealed manner. Through sealing between the lifting camera lens and the first through hole, external liquid or moisture is prevented from entering into the camera module. For a sealing structure, refer to related descriptions in FIG. 4 and FIG. 5.

An embodiment further provides a mobile terminal. The mobile terminal includes a housing and any one of the foregoing camera modules, and a base of the camera module is fastened inside the housing. For example, the terminal device may be a common mobile terminal such as a mobile phone, a tablet computer, or a notebook computer. FIG. 1 is a schematic diagram of a structure of a mobile phone. The mobile phone includes a housing 200 and a component disposed inside the housing 200. The component includes a camera module 300. During assembly, the base 10 of the camera module 300 is fastened inside the housing 200, and the housing 200 is provided with a second through hole that fits a lifting camera lens of the camera module 300. When the lifting camera lens rises, the lifting camera lens passes through the second through hole, so that the camera lens of the camera module is exposed. In use, a drive mechanism is used to drive a rotating cylinder to rotate, and the rotating cylinder is used to drive the lifting camera lens to rise or fall, thereby improving a shooting effect of the camera module. In addition, when the foregoing structure is used, the rotating cylinder is sleeved outside the lifting camera lens, so that the drive apparatus partially overlaps with the lifting camera lens, thereby reducing a size of the camera module and facilitating miniaturization development of the mobile terminal.

The housing and a casing may be an integral structure. In this case, the lifting camera lens is connected to a housing of the mobile terminal in a sealed manner, thereby enhancing a sealing effect of the entire mobile terminal.

The foregoing descriptions are merely implementations of the embodiments, but are not intended to limit the scope of the embodiments. Any variation or replacement readily figured out by a person skilled in the art within the embodiments shall fall within the scope of the embodiments.

What is claimed is:

1. A camera module, applied to a mobile terminal, wherein the camera module comprises:

a rectangular base having a support plate, wherein the base is placed inside a housing of the mobile terminal and the support plate is connected to a printed circuit board on the mobile terminal;

at least one guide pillar is disposed on the base and a lifting camera lens configured to slide relative to the base; and a drive apparatus comprising:

a rotating cylinder that is configured to rotate relative to the base and drive the lifting camera lens to rise or fall, wherein the rotating cylinder is sleeved outside the lifting camera lens;

a drive mechanism configured to drive the rotating cylinder to rotate, wherein the drive mechanism is outside the rotating cylinder and mechanically moves the rotating cylinder by a gear ring;

wherein a magnetic component is provided on the lifting camera lens; and a hall sensor mounted on the at least one guide pillar for detecting location information of the lifting camera lens magnetically based on the magnetic component.

2. The camera module according to claim 1, wherein the drive mechanism and the lifting camera lens are located on a same side of the base.

3. The camera module according to claim 2, wherein the drive mechanism further comprises:

a drive motor fastened to the base, a worm connected to the drive motor, and the gear ring disposed on an outer side wall of the rotating cylinder, wherein the worm is engaged with the gear ring.

4. The camera module according to claim 2, wherein the drive mechanism further comprises:

US 12,591,165 B2

15 a drive motor fastened to the base,
a gear connected to the drive motor, and
the gear ring disposed on an outer side wall of the rotating cylinder, wherein the gear is engaged with the gear ring.

5. The camera module according to claim 2, wherein the drive mechanism further comprises:
two drive motors that are disposed opposite to each other,
a worm separately connected to the two drive motors, and
the gear ring disposed on an outer side wall of the rotating cylinder, wherein the worm is engaged with the gear ring.

6. The camera module according to claim 1, wherein a spiral sliding groove is disposed on an inner side wall of the rotating cylinder, and the lifting camera lens is provided with a spiral slider that fits into the spiral sliding groove through sliding; or
an internal thread is disposed on an inner side wall of the rotating cylinder, and the lifting camera lens is provided with an external thread that fits the internal thread.

7. The camera module according to claim 1, wherein the lifting camera lens is assembled on the at least one guide pillar through sliding.

8. The camera module according to claim 7, wherein the at least one guide pillar is provided with the hall sensor configured to detect the magnetic component; or
the lifting camera lens is provided with the hall sensor configured to detect the magnetic component.

9. The camera module according to claim 1, wherein the lifting camera lens further comprises: a lifting cylinder, and
a camera lens fastened to the lifting cylinder.

10. The camera module according to claim 9, further comprising:
a casing connected to the base in a fastened manner, wherein the drive apparatus and the lifting camera lens are located inside the casing, and when the lifting camera lens protrudes, the lifting camera lens is exposed outside the casing.

11. The camera module according to claim 10, wherein an elastic sheet is disposed between the rotating cylinder and the base; or
an elastic sheet is disposed between the casing and the rotating cylinder.

12. The camera module according to claim 10, wherein the casing is provided with a first through hole through which the lifting camera lens passes, the lifting camera lens is exposed after passing through the first through hole, and the lifting camera lens is connected to the first through hole in a sealed manner.

13. The camera module according to claim 12, wherein a sealing ring is embedded in the first through hole, and an annular groove is disposed on a surface on which the sealing ring is in contact with the lifting camera lens.

14. The camera module according to claim 13, wherein a shoulder is disposed at one end that is of the lifting camera lens and that is exposed outside the casing, and the shoulder is configured to be in contact with the sealing ring in a sealed manner.

15. A camera module, applied to a mobile terminal, wherein the camera module comprises:
a rectangular base having a support plate, wherein the base is placed inside a housing of the mobile terminal and the support plate is connected to a printed circuit board on the mobile terminal;

at least one guide pillar is disposed on the base and a lifting camera lens configured to slide relative to the base, and
a drive apparatus comprising:
a drive block configured to slide relative to the base and drive the lifting camera lens to rise or fall,
a drive mechanism configured to slide the drive block, wherein the drive mechanism is outside the lifting lens and mechanically moves the rotating cylinder by a gear ring;
wherein a magnetic component is provided on the lifting camera lens; and
a hall sensor mounted on the at least one guide pillar for detecting location information of the lifting camera lens magnetically.

16. The camera module according to claim 15, wherein the drive mechanism further comprises: a drive motor fastened to the base and a lead screw connected to the drive motor, wherein the lead screw is threaded through the drive block and threaded with the drive block; and
the drive block is provided with a linear sliding groove that inclines relative to a sliding direction of the lifting camera lens, and the lifting camera lens is provided with a slider that is assembled into the linear sliding groove through sliding.

17. A mobile terminal, comprising:
a housing; and
a camera module, wherein the camera module comprises:
a rectangular base having a support plate,
at least one guide pillar is disposed on the rectangular base,
a lifting camera lens configured to slide relative to the base, and
a drive apparatus comprising:
a rotating cylinder configured to rotate relative to the base and drive the lifting camera lens to rise or fall, wherein the rotating cylinder is sleeved outside the lifting camera lens; and
a drive mechanism configured to drive the rotating cylinder to rotate, wherein the drive mechanism is outside the rotating cylinder and mechanically moves the rotating cylinder by a gear ring;
a hall sensor mounted on the at least one guide pillar for detecting location information of the lifting camera lens magnetically; wherein
the rectangular base is fastened inside the housing wherein the support plate is connected to a printed circuit board on the mobile terminal, a second through hole that fits the lifting camera lens is disposed on the housing, and
when the lifting camera lens rises, the lifting camera lens is exposed after passing through the second through hole.

18. The mobile terminal according to claim 17, wherein, when the camera module comprises a casing, the casing and the housing are an integral structure.

19. The mobile terminal according to claim 17, wherein the drive mechanism and the lifting camera lens are located on a same side of the base.

20. The mobile terminal according to claim 19, wherein the drive mechanism further comprises: a drive motor fastened to the base,
a worm connected to the drive motor, and
the gear ring disposed on an outer side wall of the rotating cylinder, wherein the worm is engaged with the gear ring.

* * * * *